United States Patent Office 3,632,540
Patented Jan. 4, 1972

3,632,540
BLOCK POLYMER-WAX BLENDS
George Eugene Unmuth and Charles Howard Hopkins, Tulsa, Okla., assignors to Petrolite Corporation
No Drawing. Filed June 26, 1968, Ser. No. 753,819
Int. Cl. C09j 3/26
U.S. Cl. 260—27                13 Claims

ABSTRACT OF THE DISCLOSURE

A composition of matter capable of being used as a heat sealable, moisture proof, flexible, ductile, tough, etc., coating, laminate, adhesive, etc. which comprises (1) block polymer, for example 2–35%; (2) wax, for example 96–15%; and (3) resin, for example 2–50%, by weight. These compositions are unique as compared to other wax formulations in that they are ductile and flexible at low viscosities which make them adaptable for use with equipment capable of employing only low viscosity solutions but at the same time obtaining superior results heretofore obtained only from high viscosity compositions.

These compositions are preferably prepared in a manner which minimizes oxidation by first blending the components at relatively low temperature, for example below about 200° F. such as at about 110°–180° F., and then completing the blending at relatively higher temperatures, for example above about 200° F., such as at about 250–300° F.

---

This invention relates to a composition of matter capable of being used as a heat sealable, moisture proof, flexible, ductile, tough, etc. coating laminate, adhesive, etc. which comprises (1) block polymer, for example 2–35% by weight; (2) wax, for example 96–15% and (3) resin, for example 2–50%, by weight. These compositions are unique as compared to other wax formulations in that they are ductile and flexible at low viscosities which make them adaptable for use with equipment capable of employing only low viscosity solutions but at the same time obtaining superior results heretofore obtained only from high viscosity compositions.

This invention also relates to processes of preparing these compositions which are preferably prepared in a manner which minimizes oxidation by first blending the components at relatively low temperatures for example below 200° F., such as at about 110°–180° F. and then completing the blending at relatively higher temperatures, for example above about 200° F., such as at about 250–300° F.

This invention also relates to uses for these compositions and to resulting articles of manufacture containing such compositions.

Waxes are widely used in many applications including laminants, coatings and adhesives, etc., because of their inertness, water vapor and gas transmission characteristics, freedom from odor and taste, and heat sealability. However, in many instances the waxes fail to perform as good barriers, sealants or adhesives because they lack sufficient flexibility and ductility to remain as a coherent, unbroken film under the rigorous conditions encountered in use. Because of this, many polymers and resins are blended with wax. Among the materials widely used in wax blends are butyl rubber, ethylene-vinyl acetate copolymers (E/VA), polyethylene, ethylene-vinyl acrylate copolymers and rosin-derived resins.

Most tests performed on wax or wax blends are performance tests, rather than tests of basic physical properties; nevertheless, many of the performance tests in actuality measure the tensile characteristics of a wax or wax blend under a particular set of conditions. Examples of such tests are: sealing or laminating strength tests, package abuse tests, creased water vapor and gas transmission rate, creased oil resistance test, oil resistance of flexed paper box score lines and most performance tests on adhesives. All of the above performance tests measure in one form or another the ability of a wax or blended wax to deform or withstand tensile strains without rupturing, i.e. ductility. Consequently, the single-most important basic reason for blending the various polymers, resins and rubbers with wax is to improve its ductility and flexibility.

It is common practice to blend high molecular weight synthetic rubbers with wax in order to improve flexibility and ductility. There are, however, a number of serious drawbacks to the use of wax blends containing high molecular weight materials. Table I illustrates the viscosity of high molecular weight polyisobutylene rubber (PIB)—wax blends. Viscosities of the magnitude shown in Table I are a serious obstacle to the widespread use of these rubbers in wax blends. Although coating and laminating equipment is available which can apply viscous coatings in the range of 100,000 to 300,000 centipoise, it is costly and so highly specialized that its use is limited to specialty coatings and laminants on continuous webs of papers, films and foils. There is no equipment capable of applying coatings or laminants, whose viscosity is greater than 30,000 centipoise, to preformed folding carton blanks or to preformed corrugated containers. Consequently, it often is necessary to use less high molecular weight rubber in wax blends than is required for optimum flexibility and ductility because of the deficiencies in application machinery.

TABLE I

Polyisobutylene (PIB)

Staudinger viscosity average
molecular wt.:                                    Viscosity [1]
  (1) 126,000 _____ 700,000
  (2) 110,000 _____ 450,000
  (3) 90,000 _____ 200,000
  (4) 72,000 _____ 100,000

[1] (Cps. at 210° F.) of 20% PIB in paraffin wax.

E/VA copolymers and polyethylene are also commonly used to improve the ductility of waves; however, these materials do not increase ductility as effectively as the high molecular weight, synthetic rubbers. In order to obtain high percent elongations (greater than 500%) at least 40% of the ethylene copolymers is required. With polyethylene, 80% or more is required. For example, an E/VA copolymer resin (15 MI–28 VA) when blended 50/50 with paraffin wax has a viscosity of 27–30,000 cps. at 250° F. and an elongation of 650%.

Another elastomer commonly used to increase the ductility of waxes is butyl rubber. Although butyl rubber has a lower molecular weight than the examples of PIB shown in Table I, it too increases the viscosity of wax to an unacceptable level. For instance, a binary blend consisting of 20% butyl rubber in wax has a viscosity of 80,000 cps. at 250° F. but the ultimate elongation is only 32%.

We have now discovered compositions of matter capable of being used as heat sealable, moisture proof, flexible, ductile, tough, etc. coatings, laminates, adhesives, etc. which comprise (1) block polymer, for example 2–35%; (2) wax, for example 96–15%; and (3) resin, for example 2–50%, by weight. These compositions are unique as compared to other wax formulations in that they are ductile and flexible at low viscosities which make them adaptable for use with current equipment capable of employing only low viscosity solutions but at the same time obtaining superior results heretofore obtained only from high viscosity compositions. More particularly, we have now found that wax blends having superior properties can be formulated by incorporating a particular type of polymer namely block polymer of monovinyl aromatic compound and conjugated dienes, into waxes. These new wax blends containing block polymers are extremely flexible and ductile without the undesirably high viscosity which is imparted to waxes by polyisobutylene or butyl rubber. In fact, the wax blends of this invention, although relatively low in viscosity, have the elasticity and ductility of wax blends containing a synthetic rubber having a molecular weight of several hundred thousand. We have further found that incorporation of a resin, such as the glycerol ester of hydrogenated rosin, into the wax prior to the addition of the block polymer modifies the solubility of block polymer in wax and therefore facilitates blending of the block polymer into wax, reduces the viscosity of block polymer in wax and the ternary block polymer-wax-resin mixtures have superior and unique properties.

We have also discovered that these compositions are preferably prepared in a manner which minimizes oxidation by first blending the components at relatively low temperatures, for example below about 200° F. such as at about 110°–180° F. and then completing the blending at relatively higher temperatures, for example above about 200° F., such as at about 250–300° F.

We have also discovered that these compositions have a wide variety of uses including, but not limited, to the following uses:

(1) As flexible coatings for containers fabricated from corrugated board, solid paperboard, metal, wood, etc.
(2) As heat sealable coatings for folding paper cartons, flexible paper containers, etc.
(3) As hot tack, heat-sealable coatings for flexible film packaging, etc.
(4) As heat-activated hot melt adhesives for rigid or flexible substrates, etc.
(5) As laminates for joining paper, plastic films, and metallic foils, etc.
(6) As carpet or rub-backing adhesives, etc.
(7) As pressure sensitive adhesives for flexible or rigid substrates, etc.

(a) As pressure sensitive cellophane or plastic films tapes.
   (b) As pressure sensitive masking tapes.
   (c) As pressure sensitive labels for containers or articles.
   (d) As pressure sensitive paper or plastic coated papers; wall or shelf, etc. coverings.
   (e) As pressure sensitive adhesives for coating floor tiles, etc.
   (f) As pressure sensitive adhesives for plywood, etc.

(8) As electrical potting compounds, cable filling compounds, etc.
(9) As caulking compounds.
(10) As shaped articles, such as formed by molding or extrusion.
(11) As protective coatings for structural members and parts, etc., such as pipe, steel, reinforcing members, plumbing, stuffing underwater electrical cables, wooden pilings, etc.
(12) Many other analogous, related, or different uses.

WAXES

Any suitable wax or wax substitute, natural or synthetic, can be employed. These include parafin wax, scale wax, ozokerite, Utah wax, microcrystalline wax such as plastic and tank bottom derived micro-crystalline waxes, wax substitutes such as Fischer-Tropsch wax, polyalkylenes such as polyethylene, polypropylene, etc. blends and copolymers thereof. The preferred waxes are petroleum-derived waxes. A unique class of polyethylenes which can be employed in this invention are those prepared by employing a catalyst which is a lithium complex of a chelating tertiary amine, such as described in U.S. Pat. 3,206,519 and in the Journal of Organic Chemistry 29, 2928, 1964. Also included within the term "wax" are petrolatums.

All of these waxes are well known. For example, they are described in U.S. Pat. 3,163,548 particularly under section describing oxidizable hydrocarbon waxes, which patent is by reference incorporated into the present application.

In certain instances, natural waxes such as Carnauba, etc., can also be employed.

BLOCK POLYMERS

Block polymers which are employed in this invention are illustrated by block polymers of an alkenyl aromatic compound, as illustrated by styrene, and a conjugated diene, as illustrated by butadiene. Each block unit is sufficiently large so that it retains many of the physical properties of the homopolymer independent of the presence or nature of the other blocks of different composition. These block polymers possess excellent elastomeric properties without vulcanization.

These are illustrated by elastomeric block polymers having the general formula

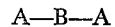
A—B—A wherein each A is an independently selected non-elastomeric polymer block having an average molecular weight of 2,000–100,000 and a glass transition temperature above about 25° C. and B is an elastomeric polymer block having an average molecular weight between about 25,000 and 1,000,000 and a glass transition temperature below about 10° C.

Preferably, these block polymers are those in which the elastomeric polymer block is that of a conjugated diene. Still more preferably, the block polymers are those in which the end blocks comprise polymer blocks of alkenyl aromatic hydrocarbons connected by a block of a polymerized conjugated diene, the latter being one capable of having a cis-1,4-content of 80–100%, such as isoprene.

These compositions comprise a major proportion of an elastomeric homopolymer or random copolymer and 5–50% by weight of a block polymer of the above description. These compositions may comprise combinations of an elastomeric polymer of conjugated dienes (e.g., isoprene) having a high (88–100%) cis 1,4-content and 5–30% by weight each of a block polymer of the above description and of a polymerized conjugated diene having a cis 1,4-content of 88–100% but of a relatively low average molecular weight in the order of 2,000–50,000.

These may be prepared by a process of polymerizing a monomer to form a non-elastic block A to such a point that all monomer is consumed, adding monomers of type B and continuing polymerization until the elastic mid section is formed and until all type B monomers are polymerized, then injecting type A monomers to form the second terminal block A by continued polymerization.

A special variety of the above described polymers comprises those having the general configuration

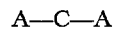
A—C—A wherein each A is an independently selected non-elastomeric polymer block having an average molecular weight from about 2,000 to about 100,000 and a glass transition temperature above 25° C., and C is an elastomeric polymer block having an average molecular weight of 25,000–1,000,000, the latter block containing an increasing ratio from one end to the other of the block of units of the monomer of blocks A, block C containing an average of 10–40% by weight of block A monomer units and having a glass transition temperature below 10° C. These special types of polymers will be referred to herein as "tapered blocks."

One process for the preparation of tapered block polymers comprises the steps of polymerizing the monomer of the non-elastomeric polymer such as an alkenyl aromatic hydrocarbon to form an initial block having a molecular weight of 2,000–100,000, in such a way that after this initial block is formed, the polymerization medium contains or has added thereto a further proportion of a monomer capable of forming non-elastomeric polymer. This mixture is then modified by the injection of monomers capable of forming an elastomeric polymer such as monomers of the conjugated diene type. Polymerization is then continued in such a way that the elastomeric mid section of the block polymer is formed. Under these conditions, the conjugated diene (or equivalent elastomeric forming monomer) polymerizes at a greater rate than does the monomeric unit of the non-elastomeric forming material. The result is that the mid section is "tapered," the section of the block forming immediately adjacent to the original non-elastomeric block predominating in the units of the elastomer-forming monomer and the block becoming increasingly rich, as polymerization proceeds, in units of the non-elastomeric type. The proportion of monomers utilized is such that after exhaustion of monomers of the elastomer-forming variety, an excess of the non-elastomeric forming monomer is present or can be added. Polymerization is then continued to form the second terminal block of non-elastomeric type.

The block polymers of this invention are to be distinguished from graft polymers, wherein segments depend from intermediate points on a linear chain. In the present instance the blocks are built end-to-end from one "living polymer" block to the next.

An essential for the success of the process comprises the utilization of polymerization environments, catalysts and monomers such that the elastomeric center block of the block polymer has a glass transition temperature below 10 C., preferably below 0° C. and still more preferably below —25° C. Usually it is good practice to achieve a cis content of 90–97% in the mid section when conjugated dienes such as isoprenes are used. Furthermore, while the terminal non-elastomeric blocks may have a molecular weight range from about 2,000–100,000 and a glass transition temperature above 25 °C., it is preferred that these terminal blocks have average molecular weights from about 5,000 to about 50,000 each, and a glass transition temperature above 30° C., better still above 50° C. Also, while the elastomeric middle block may have average molecular weights from about 25,000 to 1,000,000, it is preferred that this is between about 50,000 and 500,000. The critical difference between the terminal blocks, which are non-elastomeric, and the middle block, which is elastomeric may be expressed in ASTM Special Technical Bulletin No. 184:

"A substance that can be stretched at room temperature to at least twice its original length and, after having been stretched and the stress removed, returns with force to approximately its original length in a short time."

This defines the middle block and polymeric block which will not meet this definition constitute the non-elastomeric end blocks. The blocks are further defined by their glass transition temperatures as recited hereinbefore. The difference between the glass transition temperatures of end blocks A and center block B should at least be 40° C. preferably at least 100° C., and still more preferably at least 125° C. The end blocks in preferred polymers constitute 10–50% (better 15–40%) of the total polymer weight.

While the same monomers may be employed in either terminal or middle blocks in conjunction with different copolymerized monomers, the elastomeric or non-elastomeric character of the block will in most cases be determined by the ratio of the several monomers employed.

For example, the elastomeric mid sections may comprise copolymers of ethylene with $C_{3-18}$ monoolefins, preferably $C_{3-6}$ olefins preferably alpha olefins. Rubbery copolymers of ethylene and propylene can be formed having an ethylene content between about 60 to about 70 mol percent. On the other hand, non-elastomeric copolymers of ethylene with the same type of olefins may be prepared which have non-elastomeric properties, particularly if the ethylene ratio is relatively high. In case of ethylene and propylene, for example, non-elastomeric copolymers are formed when the ethylene content is between about 80 and about 95 mol percent.

The elastomeric mid section can be a polymer block of essentially any synthetic elastomer preferably of an aliphatic conjugated diene, such as isoprene, methyl isoprene, butadiene, copolymers of the styrene-butadiene type, and butadiene-acrylonitrile.

The non-elastomeric end blocks may comprise homopolymers of the lower olefins such as polyethylene or poly propylene as well as polystyrene, polymethyl styrene, polyacrylonitrile, polychloro styrene, and polymethyl methacrylate as well as other non-elastomeric polymeric chains. Vinyl aromatic polymer blocks are preferably mdae from one or more monovinyl aromatic hydrocarbons of the benzene series such as styrene, vinyl toluene, vinylxylene, ethylvinyl benzene, isopropylstyrene, ethylvinyltoluene, tert.-butylstyrene or diethylstyrene, or copolymers of at least 70% by weight of one or more of such mono-vinyl aromatic hydrocarbons and not more than 30% by weight of alpha-methylstyrene or esters of acrylic or methacrylic acid such as ethylacrylate, butylacrylate or methylmethacrylate.

Preferably, the elastomeric mid section blocks are those composed of aliphatic conjugated diolefins while the non-elastomeric terminal blocks are those formed by polymerizing alkenyl aromatic hydrocarbons, preferably vinyl substituted aromatic hydrocarbons, still more preferably vinyl monocyclic aromatic hydrocarbons. The most preferred species of the subject copolymers comprises block polymers of styrene terminal groups with a mid section of polyisoprene, the polyisoprene unit having a cis 1,4-content of 89–100%, usually 85–97%.

The block polymers may be regarded as being of two types: (1) "pure" block polymers, in which the terminal blocks are distinctly separate with regard to the unit species from the mid section elastomeric block, and (2) block polymers employing the "tapered" mid section block referred to hereinbefore. Essentially, however, these must be considered together as requiring an elastomeric mid section coupling two terminal non-elastomeric blocks. Their method of preparation will differ essentially in the timing of injection of the monomer from which the major portion of the mid section elastomeric section is made. While it is possible to utilize one type of initiator and/or medium for initial polymerization of a terminal block and another catalyst and medium for the mid section it is preferred that the same medium and essentially the same initiator be employed throughout the formation of the several blocks since this is the most efficient type of process. Of course temperatures times of polymerization, concentrations of polymer and monomer in solvent and ratio of initiator to monomer may be varied to optimize conditions for forming the initial terminal block on the one hand, thereafter the mid elastomeric section and finally the formation of the section terminal non-elastomeric block.

In the interest of obtaining the highest possible cis content consistent with the production of economically low cost polymers and at the same time having full control over the degree of and type of polymerization as well as the use of catalyst and media suitable for use in both terminal and mid section polymerization, it is preferred that the polymerization be one which utilizes a relatively inert hydrocarbon solvent in conjunction with a lithium based initiator. In the former method, the catalyst comprises lithium metal, and alkyl lithiums or other lithium compounds as described in U.S. Pats. 2,849,432, 2,856,391 and 2,913,444. All of these result in the formation of synthetic polymers having the desired properties. Other lithium compounds include lithium hydrocarbyl organo lithium amides, but the alkyl lithium compounds are particularly preferred.

The alkyl lithiums include especially those having up to 8 carbon atoms per molecule. While the normal alkyl lithium compounds are useful, they entail certain disadvantages relative to an induction period at the start of polymerization. Branched chain and preferably secondary alkyl lithium compounds are preferred since induction periods are substantially limited. Suitable branched chain alkyl lithium compounds include especially secondary butyl lithium, isobutyl lithium, isoamyl lithium, secondary amyl lithium, and the like.

The inert hydrocarbon solvent is preferably an alpha olefin or lower alkaline although aromatic hydrocarbons such as benzene, and the like may be utilized. Preferred aliphatic (including cycloaliphatic) hydrocarbon solvents include cyclohexane and mixtures thereof with aromatic hydrocarbons such as benzene.

Polymerization is normally conducted at temperatures in the order of $-20$ to about $100°$ C., preferably at temperatures between about 20 and $65°$ C. The proportion of initiator should be maintained as low as possible but may be varied over a relatively wide range from about 1 to about 200 parts per million based on the weight of the monomers present. The basic process when using a lithium based catalyst comprises forming a solution of the inert hydrocarbon and monomer from which the first terminal non-elastomeric polymer block is to be made. Preferably, as stated hereinbefore, this is an alkenyl, e.g., vinyl, aromatic hydrocarbon such as styrene or an alkylated styrene. The lithium initiator is then injected and the temperature of the mixture maintained within the range specified above and known to experts in the rubber art. Initiators temperatures, and solvents as well as monomer content are adjusted so as to produce a first terminal polymeric block having an average molecular weight between about 2,000 and 100,000.

In the preparation of the "pure" block polymers, the conditions are adjusted so that essentially no monomer is left in the reaction mixture at the time when the average molecule weight of the polymer is within the range specified above. At this time, the monomer from which the elastomeric mid section is to be produced is added. This is preferably a conjugated diene such as isoprene or methylisoprene. The temperature, initiator concentration, solvent ratio, etc., may be adjusted at this time to optimize the production of an elastomeric mid section block which attached to the first non-elastomeric terminal block previously produced. Again, conditions are adjusted so that essentially all of the second monomer is exhausted at the time the desired average molecular weight of the elastomeric mid section is obtained. After this, a second addition of a monomer capable of producing a non-elastomeric terminal block is made and polymerization is continued to the point where this second terminal block has obtained an average molecular weight of 2,000–100,000. The block copolymer so produced then has the general configuration

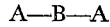

as defined hereinbefore.

While it is preferred that the polymerization be conducted in solution, which results in the formation of a cement, under certain conditions and with certain catalysts, or initiators, emulsion polymerization may be employed. The block polymer, after its formation, is preferably precipitated by contact with a precipitant such as steam or water or a combination thereof in such a manner as to result in the formation of crumbs which are then separated from the aqueous medium and subjected to dewatering and drying procedures. Details involving the addition of chain terminators and the like are known in the art. Such terminators include materials such as water, $CO_2$, alcohols, esters, or acids. These are usually added after lithium based polymerization for the purpose of reaction with lithium end groups on each of the molecule chains.

Variations on the above described procedure are necessary for the preparation of the so-called "tapered" mid section. The variation generally comprises the use of an excess amount of monomeric units of the first type, namely, those employed for the formation of the non-elastic terminal blocks. At the time the latter reaches the desired molecular weight range (2,000–100,000) a sufficient amount of the same monomer (preferably 20–80% of the original monomer) is present in the mixture or is added thereto. Thereafter one or more monomers of the type capable of forming an elastomeric block is added and polymerization proceeds. It has been found that monomers of the latter type show a greater activity under a given set of catalytic conditions than those of the first type. Therefore, the end of the mid section block which is directly attached to the first non-elastic terminal block predominates in units of the type capable of forming elastomeric copolymers. As this mid section molecule weight increases, however, the proportion of the elastomeric units decrease relative to the non-elastic monomer source, the chain becomes increasingly rich in units of the latter type. Hence, the term "tapered" is applied to this type of mid section.

The proportion of units capable of forming non-elastic polymers present in this type of tapered mid section is between about 5 and about 50 weight percent (preferably 10–40%). At the time the desired mid section molecular weight is achieved the reaction mixture should contain or have added thereto sufficient monomers of the type capable of forming non-elastic terminal blocks in the virtual absence of any of the monomers forming elastic mid section blocks. Polymerization then proceeds with the formation of the non-elastic block to form the block polymers A—C—A in which the unit C is a tapered copolymer block as described above.

These block copolymers not only are characterized by low glass transition temperature of the elastomeric mid section and the relatively higher glass transition temperature of terminal non-elastomeric blocks, but also by their intrinsic viscosity which normally is within the range from about 0.7 to about 5.0. The polymers have average molecular weights from about 75,000 to about 2 million, preferably between 75,000 and 500,000.

The glass transition temperatures are preferably determinated by dilatrometric methods. A discussion of this phenomenon and a table of glass transition temperatures are given in Whitby, "Synthetic Rubber" (1954), pages 356–360. The following examples illustrate the preparation of the subject block polymers and their use in rubber compositions.

Illustrative block polymers are described in U.S. Pats. 3,231,635, 3,265,765 and elsewhere, which patents are incorporated into this patent application as if part hereof.

"Kraton" 101 and 102 manufactured and sold by Shell Chemical Co. are block polymers described as styrene-butadiene block polymers and claimed in U.S. Pat. 3,265,-765. They are defined by the claims of the patents which are as follows:

(1) As a novel composition of matter, an unvulcanized elastomeric block copolymer having the general configuration.

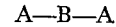

wherein each A is an independently selected non-elastomeric monovinyl aromatic hydrocarbon polymer block having an average molecular weight of 2,000–100,000 and a glass transition temperature above about $25°$ C. the total block A content being 10–50% by weight of the copolymer, and B is an elastomeric conjugated diene polymer block having an average molecular weight between about 25,000 and 1,000,000 and a glass transition temperature below about 10° C., said copolymer having been prepared with a lithium-based catalyst and having a tensile strength at 23° C. in excess of about 1400 pounds per square inch.

(2) A block copolymer according to claim 1 having the configuration polystyrene-polybutadiene-polystyrene.

(3) A new composition of matter comprising an elastomeric homopolymer of conjugated dienes, and 5–50% by weight of a block copolymer according to claim 1.

(4) A composition of matter comprising a major proportion of an elastomeric homopolymer of conjugated dienes having a cis 1,4-content of 80–100% and an average molecular weight of 200,000–1,000,000,, 5–30% by weight of a block polymer according to claim 1, and 5–30% by weight of a polymerized conjugated diene having a cis 1,4-content of 80–100% and an average molecular weight of 2,000–50,000.

(5) A new composition of matter comprising an elastomer of the group consisting of conjugated diene homopolymers and random copolymers of conjugated dienes with vinylaromatic hydrocarbons and 5–50% by weight of block copolymers according to claim 1.

(6) As a novel composition of matter an unvulcanized elastomeric block copolymer having the general configuration

A—B—A wherein each A is an independently selected non-elastomeric monovinyl aromatic hydrocarbon polymer block having an average molecular weight of 5,000–50,000 and a glass transition temperature above 25° C., the total block A content being 10–50% by weight of the copolymer, and B is an elastomeric conjugated diene polymer block having an average molecular weight between about 50,000–500,000 and a glass transition temperature below about 10° C., said copolymer having been prepared with a lithium based catalyst and having a tensile strength at 23° C. in excess of about 1400 pounds per square inch.

(7) A block copolymer according to claim 6 wherein the blocks A and B have a difference in glass transition temperature of at least 100° C.

(8) A new composition of matter comprising an elastomer of the group consisting of conjugated diene homopolymers and random copolymers of conjugated dienes with monovinyl aromatic hydrocarbons and 5–50% by weight of block copolymers according to claim 6.

(9) As a novel composition of matter, an unvulcanized elastomeric block copolymer having the general configuration

A—B—A wherein each A is a non-elastomeric monovinyl arene polymer block having an average molecular weight of 5,000–50,000 and a glass transition temperature above about 50° C., and B is an essentially linear conjugated diene polymer block having an average molecular weight between about 50,000 and 500,000 and a glass transition temperature below about −25° C., the blocks A and B having a difference of glass transition temperature of at least 125° C., the blocks A constituting 15–40% of the total polymer weight, said copolymer having been prepared with a lithium based catalyst and having a tensile strength at 23° C. in excess of about 1400 pounds per square inch.

(10) As a novel composition of matter, an unvulcanized elastomeric block copolymer having the general configuration

A—B—A wherein each A is a non-elastomeric polystyrene block having an average molecular weight of 5,000–50,000, the total block A content being 10–50% by weight of the copolymer and B is an elastomeric polyisoprene block having an average molecular weight of 5,000–500,000 and a cis-1,4-content of 80–97%, said copolymer having been prepared with a lithium alkyl catalyst and having a tensile strength at 23° C. in excess of about 1400 pounds per square inch.

RESINS

A wide variety of resins can be employed in preparing the blends of this invention. The resin selected should be one which enhances the solubility and hence the blendability and viscosity of block polymers and wax without distracting substantially from the desired properties. A resin generally suitable for hot melt block polymers-wax-resin blends is one which does not exhibit liquid phase separation.

In general, the resins which are suitable for use in this invention are a class of solid or semi-solid organic-products of natural and/or synthetic origin, generally non-crystalline and of medium or high molecular weight with no definite crystalline melting point which is water-insoluble but soluble in paraffinic hydrocarbon solvents.

As is well known, there are many chemical classes of resins and under each class there are hundreds of resins which differ slightly or greatly from each other.

In general, in the absence of side reactions and properties, any soluble resin can be employed with little or no effect on the end use properties. The major differences which exist between the resins soluble in the wax blends are the following:

(1) Resistance to oxidation.
(2) Odor and color.
(3) Resistance to sludge formation upon extended heating.

Stated another way, any resin can be employed which as a ternary composition enhances the solubility and hence blendability and viscosity of the binary mixture of block polymers and wax without detracting substantially from the desired properties, provided that such ternary blend as a hot melt does not exhibit liquid phase separation. The following is an exemplary list of resins suitable for this purpose.

In general, the term "resin" as employed herein is that generally employed in the paint, varnish and packaging industry with the proviso that they can perform the function stated herein. Such resins are described for example in many well known publications in the paint, varnish and packaging fields.

TABLE II.—RESINS

| Example No. | Chemical type | Branded product |
|---|---|---|
| 1 | Rosin (wood, gum or sulphate) | Rosin. |
| 2 | Esters of rosin | Abalyn. |
| 3 | Hydrogenated rosin | Hercules Staybelite. |
| 4 | Esters of hydrogenated rosin | Do. |
| 5 | Dimerized rosin | Dymerex. |
| 6 | Esters of dimerized rosin | Hercules Pentalyn K. |
| 7 | Disproportionated rosin | Nilox U. |
| 8 | Esters of disproportionated rosin | |
| 9 | Coumarone-indene | Cumar MN 2½. |
| 10 | Alpha methyl styrene/vinyl toluene (including substituted monomers). | Piccotex 120. |
| 11 | Terpene polymers | Nirez 1085. |
| 12 | Styrene-indene-isoprene terpolymers | Velsicol XL–30. |
| 13 | Terpene phenolics | LTP 100, Penn. Ind. |
| 14 | Hydroabietyl alcohol | Abitol. |
| 15 | Esters of hydroabietyl alcohol | Cellolyn 21. |

Additives known to the rubber and/or wax art may be added to the blends. These are too well known to require voluminous listings. Typical examples include the following:

(1) Antioxidants to reduce oxidation of the blend.
(2) Additives to reduce friction and improve the blocking point of the blends, such as the fatty acid amides and the like.
(3) Pigments and fillers such as titanium dioxide or calcium carbonate may be added to opacify, or change the color of the blends.
(4) Various other synthetic rubbers, copolymers and homopolymers generally known in the art and used to modify a particular property of the resultant blend.
(5) Defoaming or anti-foam agents.
(6) Wetting agents.
(7) Solvents designed to modify flow characteristics or to promote surface wetting.
(8) Other additives known to rubber and/or wax art.

Block polymers can be milled or mixed directly into waxes, resins or wax-resin systems only with extreme difficulty and only if oxidation of the block polymer molecule is prevented. The block polymer molecule, due to its unsaturation, is highly susceptible to high temperature oxidation, which drastically reduces the solubility of block polymers in waxes, resins or wax-resin systems. At moderate mixing temperatures ranging from about 250° F. to about 300° F., the time required to obtain solution of the block polymers is so extremely long that prevention of oxidation is impractical. In fact it is difficult to incorporate block polymers into waxes using temperatures of 250–300° F., because even though protected by chemical anti-oxidants and blanketed with the inert gas to exclude oxygen, the block polymer oxidizes and discolors, and resists all attempts at solution. At higher temperatures, generally ranging from about 350° F. to about 425° F., block polymers can be brought into solution in wax, resins or wax-resin systems in a matter of hours. Because of the high temperatures used in this procedure, prevention of oxidation of the block polymer is a severe problem and requires critical control in order to be successful.

We have found that mixing or milling of block polymers into waxes, resins, or wax-resin blends can be facilitated, and oxidation of the block polymer substantially eliminated by employing a two-step process. The first step consists of blending or milling the block polymer into the wax, resin or wax-resin blend at relatively low temperatures such as below about 200° F. for example about 110° F. to about 180° F., until they are interdispersed. This results in the preparation of a complex two-phase system of which the external phase consists of liquid or semi-liquid wax, resin or wax-resin blend and a dispersed phase consisting of solid block polymer particles in which is dissolved a substantial portion of wax, resin or wax-resin blend. The second step consists of rapidly raising the temperature of the complex dispersion to a relatively higher temperature such as above about 200° F. for example from about 250–300° F. while mixing; the dispersed phase rapidly dissolves in the external phase with no tendency to oxidize.

All the examples specified herein are prepared by this two step process—Step 1 at 110–180° F. and Step 2 at 250–300° F.

The block polymer-wax blends are of two general types; first, binary blends consisting of block polymers and wax, and secondly, ternary blends consisting of block polymers, wax and a resin. From an economic view it is desirable to add as little block polymer consistent with obtaining the desired properties. Thus, we have prepared blends containing at least 1% by weight of a block polymer. In general, blends containing at least 2% block polymer exhibit some elastomeric properties, which increase with increasing concentrations of block polymer. In the binary system, elastomeric properties are dependent primarily on the block polymer content, and to a lesser extent upon the wax type. In the ternary systems, the elastomer properties are dependent both upon block polymer content and upon the resin content, and to a much lesser extent upon the wax.

Examples of the general properties of binary block polymer-wax blends are shown in Table III.

TABLE III

| Ex. | Composition by weight | Viscosity at 250° F. (c.p.s.) | Ultimate elongation (percent) |
|---|---|---|---|
| 1 | 5% block polymer (Kraton 102)<br>95% paraffin wax | 17 | 2 |
| 2 | Block polymer (Kraton 102)<br>90% paraffin wax | 172 | 11 |
| 3 | 20% block polymer (Kraton 102)<br>80% paraffin wax | 10,688 | 500 |
| 4 | 20% butyl rubber<br>80% microcrystalline wax | 69,000 | 32 |

NOTE.—The paraffin wax is a fully refined wax with a melting point of 135/137° F.

The uniqueness of the binary block polymer-wax blends in relationship to wax blends containing other synthetic rubbers is shown in the differences of the properties of Examples 3 and 4 in Table III. The behavior of Example 3, consisting of 20% polymer and 80% paraffin wax, when cold-drawn in the solid state further illustrates the uniqueness of binary block polymer-wax blends. Example 3 is a translucent, hard and rigid solid, physically resembling paraffin wax. When, however, Example 3 is cold-drawn to a point less than its 500% Ultimate Elongation, the appearance and physical form change unexpectedly. After cold-drawing, Example 3 becomes an opaque, rubbery, very-flexible solid which physically resembles white, pigmented natural or synthetic rubber; and thereafter it may be stretched repeatedly to a point less than its ultimate elongation exhibiting stretch and elasticity similar to vulcanized rubber. The behavior of binary block polymer-wax blends upon cold-drawing is uniquely different from the normal, expected behavior of polymeric films such as polyethylene and polypropylene which be-

TABLE IV

| Ex. | Composition | Viscosity at 250° F. (c.p.s.) | Ultimate elongation (percent) |
|---|---|---|---|
| 1 | 5% block polymer (Kraton 101)<br>5% SE10<br>90% paraffin wax | 22 | 2 |
| 2 | 5% block polymer (Kraton 101)<br>30% SE10 resin<br>65% paraffin wax | 26 | 140 |
| 3 | 5% block polymer (Kraton 101)<br>50% SE10 resin<br>45% paraffin wax | 150 | 2,000 |
| 4 | 10% block polymer (Kraton 101)<br>5% SE10 resin<br>85% paraffin wax | 1,396 | 10 |
| 5 | 10% block polymer (Kraton 101)<br>30% SE10 resin<br>60% paraffin wax | 996 | 1,400 |
| 6 | 10% butyl rubber<br>50% SE10 resin<br>40% microcrystalline wax | 5,140 | 496 |
| 7 | 10% block polymer (Kraton 102)<br>50% SE10 resin<br>40% microcrystalline wax | 94 | 1,200 |
| 8 | 20% block polymer (Kraton 101)<br>5% SE10 resin<br>75% paraffin wax | 20,000 | 1,700 |
| 9 | 20% block polymer (Kraton 101)<br>30% SE10 resin<br>50% paraffin wax | 8,000 | 2,000 |
| 10 | 15% butyl rubber<br>50% SE10 resin<br>35% microcrystalline wax | 69,000 | 795 |
| 11 | 33⅓% ethylene vinyl acetate copolymer (MI 5%-VA 28).<br>66⅔% paraffin wax | 5,000 | 50 |
| 12 | 70% DYNH polyethylene<br>30% paraffin wax | | 30 |

SE10 resin in the above table is an ester of hydrogenated rosin manufactured by Hercules Chemical Co. which is sold under the "Staybelite" Ester 10 trademark.

The paraffin wax is a fully refined wax having a melting point of 135/137° F.

The microcrystalline wax is a fully refined wax having a melting point 143/148° F. of come more rigid, more transparent and less elastomeric upon cold-drawing.

The pertinent properties of the ternary blends of block polymer-wax and resin are shown in Table IV. Table IV illustrates the dependence of the Ultimate Elongation upon the relative concentration of both block polymer and resin and the very low melt viscosities of block polymer-wax-resin blends, and shows very graphically the differences between the blends of this invention, and other commonly used polymer-wax blends.

The wax blends shown in Table IV as Examples 6 and 7 are typical direct comparison between ternary block polymer blends and ternary butyl rubber blends. The ternary block polymer blend Example 7 has a very high Ultimate Elongation and low viscosity, while the ternary butyl rubber blend Example 6 has a high viscosity and moderately high Ultimate Elongation. Example 10 of Table IV illustrates the extremely high viscosity of ternary butyl rubber blends at slightly higher butyl rubber content, which does not yet have the Ultimate Elongation of Example 7 of Table IV.

Table V illustrates further the elastomeric character of ternary block polymer blends compared to butyl rubber. Fatigue tests were performed on these two examples on a tensile tester. The compositions of Example 1 and Example 2 were cycled repeatedly between (a) 45 and 50% Elongation, (b) 145 and 150% Elongation, and (c) 245 and 250% Elongation. The values in Table V show the number of complete cycles required to induce failure. Particularly unique is the very low viscosity of Example 1 compared to Example 2, and the highly elastomeric characteristics and resistance to fatigue failure induced by alternately stretching and relaxing the material.

The elastic characteristics of these blends are exceedingly important to their use as adhesives and are generally associated with the highest quality natural and synthetic rubber adhesives applied from solvent or aqueous systems. This characteristic enables an adhesive to deform elastically and thus prevent stress concentration in the adhesive joint caused by the thermal expansion or contraction of the members of the joint. It also prevents stress concentration at adhesive-adherend interfaces which can cause an adhesive joint to fail under very low applied total force.

In respect to the effect of cold-drawing upon the tensile characteristics, ternary block polymer blends may or may not exhibit a phenomenon similar to that found in binary blends depending upon the resin content of the ternary block polymer blend. Upon cold drawing, ternary block polymer blends exhibit a behavior similar to binary block polymer blends at low resin contents, but this behavior gradually decreases at higher concentrations of resins. In other words, ternary block polymer blends containing less than 30% resin are hard, rigid but nonbrittle materials prior to cold-drawing, but become rubbery, opaque solids after cold-drawing. Above 30% resin content, the ternary block polymer blends are very flexible and translucent solids both prior to and after cold-drawing. Furthermore, these ternary block polymer compositions exhibit true elastomeric properties in that they may be stretched to approximately 50–90% of their Ultimate Elongation, and upon release of the stress return rapidly to approximately their original dimensions. In contrast the more common copolymers and rubbers such as butyl rubber, although flexible and ductile, tend to cold-flow under stress, and do not upon release of the stress return to their original dimensions.

Ternary systems exhibit improved liquid state compatibility as judged by the reduction in the time required to blend block polymers. The resins listed in Table II tend to reduce by 50% the time required for wax to penetrate and dissolve in the particles of block polymer in Step 1 of the mixing procedure described herein.

Resins significantly reduce the viscosity of block polymer in wax blends. Particularly unique and surprising is the fact taht ternary block polymer blends have a lower viscosity than either binary blends of the block polymer in wax or the block polymer in resins. Table VI illustrates this in one particular ternary system.

TABLE V.—FATIGUE TESTS

| Example | Composition | Elongation between which examples were strained (percent) | | | Viscosity (cps.) at 250° F. |
|---|---|---|---|---|---|
| | | 45–50 | 145–150 | 245–250 | |
| | | Cycles required for failure | | | |
| 1 | 10% block polymer (Kraton 102)<br>50% SE10 (Staybelite Ester 10)<br>40% micro wax | 250,000 | 5,000 | 1,000 | 94 |
| 2 | 10% butyl rubber<br>50% SE10 (Staybelite Ester 10)<br>40% micro wax | 330 | 150 | 0 | 5,140 |

The microcrystalline wax is a fully refined wax having a melting point of 143/148° F.

TABLE VI

| Example | Composition | Viscosity (cps. at 250° F.) |
|---|---|---|
| 1 | 10% block polymer (Kraton 101)<br>90% SE10 resin | 18,020 |
| 2 | 10% block polymer (Kraton 101)<br>90% paraffin wax | 3,276 |
| 3 | 10% block polymer (Kraton 101)<br>5% SE10 resin<br>85% paraffin wax | 1,396 |
| 4 | 10% block polymer (Kraton 101)<br>30% SE10 resin<br>60% paraffin wax | 996 |

SE10 resin is the glycerol ester of hydrogenated rosin.
The paraffin wax is a fully refined wax having a melting point of 135/37° F.

The block polymer-wax-resin blends were tested and found to be excellent laminants and/or adhesives. For example, they are excellent laminants and/or sealants for K-type cellophane, aluminum foil, polypropylene film, glassine, paper and cloth. Hot melt coatings or adhesives consisting essentially of block polymers, resin and petroleum wax adhere tenaciously to those plastics used to form films or shaped articles, metallic foils or shaped articles, to the synthetic and natural fibers used in fabrics, to both synthetic and natural rubber and to leather and leather substitutes. In fact, we have found no materials to which particular ternary block polymer blends will not adhere; including such difficult to adhere materials as Teflon sheeting.

The following examples are presented for purposes of illustration and not of limitation:

TABLE VII

| Ex. | Adhesive composition | Adherends | Laminating strength, grams/inch |
|---|---|---|---|
| 1 | 10% block polymer (Kraton 101) <br> 45% resin SE10 <br> 45% micro wax | (a) Saran coated cellophane <br> (b) 25#/R Paper <br> (c) Polypropylene film <br> (d) Aluminum foil <br> (e) 25#/R Glassine | 790 <br> 1,100 <br> 1,500 <br> 1,150 <br> 820 |
| 2 | 25% Elvax 250 <br> 25% resin (SE10) <br> 50% paraffin wax | Cotton twill | 720 |
| 3 | 10% block polymer (Kraton 101) <br> 15% resin SE10 <br> 75% paraffin wax | ......do...... | 3,040 |
| 4 | 20% block polymer (Kraton 101) <br> 15% resin (SE10) <br> 65% paraffin wax | ......do...... | >4,000 |

The microcrystalline wax is a fully refined wax having a melting point of 143/148° F.
SE10 resin is the glycerol ester of hydrogenated rosin.
The paraffin wax is a fully refined paraffin wax having a melting point to 135/37° F.

The blends of this invention have a wide variety of uses, for example as coatings, laminants, adhesives, caulking compounds, etc. They may be used as hot-melt adhesives on containers and box closures, as shoe adhesives, etc. They may be used to bind the tufts to the jute backing of certain type of rugs. They may be used as coatings on corrugated containers, or boxboard containers since such application requires that the coating be extremely flexible in order to resist cracking at score-lines. They may be used as pressure-sensitive adhesives on tapes and films. They may be formed into shaped articles such as containers, cups, etc.

In fact, these blends are particularly useful for heat-sealable systems which require good adhesion, flexibility and elasticity.

In addition to the flexible and heat-sealable assemblies obtainable by coating, lamination or use of adhesive system joints on paper, paperboard or other substrates, the compositions of this invention can also be used to make molded or shaped articles. In this application, use is made of the surprising toughness and elongation exhibited by the compositions. Shaped or molded articles may be prepared from the compositions of the invention by standard manufacturing techniques, for example, injection moldings.

The following examples illustrate a few of the many uses to which the compositions of this invention can be applied. Although a wide variety of types of block polymers, resin and wax may be employed, "Kraton" 101 or "Kraton" 102 are typical of block polymers, Staybelite Ester 10 which is an ester of hydrogenated rosin is typical of the resins; petroleum wax is such as paraffin or microcrystalline waxes are typical of waxes.

USE EXAMPLES (1) Flexible coatings for containers fabricated from corrugated board, solid paperboard, wood or metal Corrugated board is coated on one or both sides with hot-melt coatings for either protection of the board and contents or for appearance, generally by means of curtain coaters, but sometimes on roll or spray coaters. Wood or metal containers are most often spray-coated.

Formulations having the following compositions can be employed:

| | Percent |
|---|---|
| Block polymer | 5–15 |
| Resin | 5–30 |
| Wax | 90–55 |

(2) Heat-sealable coating for folding paperboard cartons, or flexible paper containers Paperboard cartons and paper are coated with wax-based hot-melt coatings to provide protection to the surface against abrasion, and water and to protect the contents against gain or loss of moisture vapor and other gases. The coating equipment may be "cold water waxers" where the coating material is applied by means of felt-covered steel rolls or on "hot-melt" coating equipment whereby high viscosity hot melts are applied by gravure, offset gravure or doctored roll coaters; the hot coatings after burnishing and reheating are chilled rapidly by either water showers or by contacting highly polished steel belts.

Formulations having the following compositions may be employed:

| | Percent |
|---|---|
| Block polymer | 10–20 |
| Resin | 10–30 |
| Wax | 80–50 |

(3) Hot tack, heat-sealable coatings for flexible film packaging

Many glassines, paper or plastic combinations are coated with a heat-sealable hot-melt coating based on petroleum waxes. These finished packaging materials are used to package various food items such as potato chips using packaging machinery known in the trade as "Form and Fill." Form and Fill machinery utilizes continuous rolls of flexible packaging materials and forms it into bags or containers, simultaneously filling the partially formed bag with the food product, and finally heat-sealing the top closure. Because of the stresses placed on the heat-sealed areas and the speed of operation, the heat-sealable coatings must exhibit adhesive strength while still hot in order to hold the container together until the adhesive cools—this property is known as "hot tack." The substrates are coated utilizing conventional hot-melt coating equipment. The block polymer blends exhibit this property.

Formulations having the following compositions may be employed:

| | Percent |
|---|---|
| Block polymer | 10–20 |
| Resin | 15–30 |
| Wax | 75–50 |

(4) Heat activated hot melt adhesives for rigid or flexible substrates

There are a multitude of uses for heat-activated adhesives for bonding together similar or dissimilar members. Among these are book bindings, container closures and seams for paper or corrugated board, shoe components, leather goods, fabrics for forming into garments and other articles formed from fabrics, or repairing same, plastic or paper bag closures, and seams, fabrication of corrugated board.

In all adhesive uses, the latex or solvent grades based on synthetic or natural rubbers predominate with various types of hot-melt adhesives entering the market strongly, the principal reason for this being, elimination of flammable solvents and driers to remove either the water or the solvent from the adhesive.

Formulations having the following compositions may be employed:

| | Percent |
|---|---|
| Block polymer | 15–30 |
| Resin | 15–40 |
| Wax | 70–30 |

(5) Laminants for joining paper, plastic films and metallic foils

Many packaging materials and other industrial products consist of two or more of these materials joined together into a composite structure. These composites afford vastly improved gas and moisture barriers and tensile characteristics not obtainable with any single member of the structure. The adhesives used to join or laminate together these materials may be latex or solvent adhesives, petroleum waxes, or hot-melt adhesives. They are applied to the various substrates by a wide variety of coaters including roll, gravure and extrusion laminators. The solvent and latex adhesive must be dried at some stage of the laminating process while hot-melts and petroleum waxes need only be cooled.

Formulations having the following compositions may be employed.

| | Percent |
|---|---|
| Block polymer | 5–15 |
| Resin | 10–40 |
| Wax | 85–45 |

(6) Carpet or rug backing adhesives

These adhesives are used to bond the tufts to the jute or polypropylene backing and often to bond a second jute or polypropylene backing to the primary backing to which the tufts are attached. Currently, the bulk of these adhesives consist of SBR latex containing a mineral filler. These adhesives are applied by means of roll coaters with the excess being removed by blades or plows, and are dried by passing thru very large driers. Hot-melt adhesives are now entering this field as they may be applied at higher speeds and eliminate the costly drying procedure.

Formulations having the following compositions may be employed.

| | Percent |
|---|---|
| Block polymer | 10–25 |
| Resin | 15–50 |
| Wax | 75–25 |

(7) Pressure sensitive adhesives for flexible or rigid substrates

Normally, are based on synthetic-rubber-resin blends and are applied from non-aqueous solutions which require highly sophisticated driers to remove the solvent from the coatings. Highly pressure-sensitive, elastomerical coatings based on ternary block SBR blends would eliminate much of the costly equipment required to handle and dry coatings containing volatile, inflammable solvents.

Formulations having the following compositions may be employed:

| | Percent |
|---|---|
| Block polymer | 10–25 |
| Resin | 40–60 |
| Wax | 50–20 |

Uses

Pressure sensitive cellophane or plastic film tape
Pressure sensitive masking tape
Pressure sensitive labels for containers or articles
Pressure sensitive paper or plastic coated paper; wall, shelf, etc. coverings
Pressure sensitive adhesives for coating floor tile
Pressure sensitive adhesives for plywood

(8) Electrical potting compounds and cable filling compounds

Many electrical parts, particularly electronic parts, are protected from moisture by embedding the part in a wax, or blended wax. In addition, underwater cables are often filled with wax between the conductor and the outer sheath as a water barrier and as an electrical insulator.

Formulations having the following compositions may be employed:

| | Percent |
|---|---|
| Block polymer | 5–20 |
| Resin | 0–20 |
| Petroleum wax | 95–60 |

(9) Caulking compounds

Modern methods of construction, which employs large expanses of dissimilar materials such as masonry and glass, or stainless steel and glass, must provide expansion joint which are sealed with elastomeric compounds.

Formulations having the following compositions may be employed:

| | Percent |
|---|---|
| Block polymer | 10–30 |
| Resin | 10–30 |
| Wax | 80–40 |

(10) Shaped articles

Shaped articles, such as containers or sheeting, are commonly made by extrusion or molding. Many of the common plastics are used such as polyethylene or polypropylene.

Formulations having the following composition may be employed:

| | Percent |
|---|---|
| Block polymer | 10–35 |
| Resin | 0–25 |
| Wax | 90–40 |

(11) Protective coatings for structural members and parts

Many wood or metal structural parts are coated and/or partially impregnated with various types of materials such as asphalt to afford protection against corrosion or the other deleterious effects of water, air and minerals. The Block polymer ternary blends offer opportunities for the use of much lower viscosity materials than asphalt to coat, impregnate or otherwise protect the structural member.

Formulations having the following compositions may be employed:

| | Percent |
|---|---|
| Block polymer | 15–30 |
| Resin | 10–20 |
| Wax | 75–50 |

Uses: Including but not limited to: pipe, steel reinforcing members, plumbing, stuffing underwater electrical cable, wooden pilings.

As is quite evident, other block polymers, waxes and resins are also useful in our invention. It is, therefore, not only impossible to attempt a comprehensive catalogue of such composition, but to attempt to describe the invention in its broader aspects in terms of specific chemical names of components used would be too voluminous and unnecessary since one skilled in the art could by following the description of the invention herein select block polymers, waxes and resins to produce useful compositions. This invention lies in the use of such formulations and their individual compositions are important only in the sense that their properties yield a useful formulation. To precisely define each specific useful component in light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduce with confidence the applicability of specific block polymers, waxes, and resins suitable for this invention by applying them in the manner set forth herein. In analogy to the case of a machine, wherein the use of certain materials of construction or dimensions of parts would lead to no practical useful result, various materials will be rejected as inapplicable where others would be operative. We can obviously assume that no one will wish to use a useless composition nor will be misled because it is possible to misapply the teachings of the present disclosure to do so. Thus, any composition containing block polymers, waxes, and resins having the properties stated herein can be employed.

Having thus described our invention what we claim as new and desire to obtain by Letters Patent is:

1. A composition of matter comprising
   (I) an unvulcanized elastomeric block copolymer having the configuration

A—B—A wherein
   A is a non-elastomeric alkenyl aromatic hydrocarbon polymer block having an average molecular weight from about 2,000–100,000 and a glass transition temperature above 25° C., A being a substance that cannot be stretched at room temperature to at least twice its original length and does not return with force to approximately its original length in a short time after having been stretched and the stress removed, and
   B is an elastomer conjugated diene polymer block having an average molecular weight from about 25,000 to 1,000,000 and a glass transition temperature below about 10° C., B being a substance that can be stretched at room temperature to at least twice its original length and, after having been so stretched and the stress removed, returns with force to approximately its original length in a short time,
   the total A content being between about 5 and about 50% by weight of said block copolymer A—B—A,
   (II) resin selected from the group consisting of rosin, esters of rosin, hydrogenated rosin, esters of hydrogenated rosin, dimerized rosin, esters of dimerized rosin, disproportionated rosin, esters of disproportionated rosin, coumarone-indene, alpha methyl styrene/vinyl toluene, terpene polymers, styrene-indene-isoprene terpolymers, terpene phenolics, hydroabietyl alcohol and esters of hydroabietyl alcohol, and
   (III) wax selected from the group consisting of natural waxes and synthetic waxes,
   the proportion by weight of said components (I), (II) and (III) being
   (I) about 2–35%,
   (II) about 2–50% and
   (III) about 96–15%,
   prepared by the process comprising blending components (I), (II) and (III), in the proportions, by weight, of about 2–35%, about 2–50% and about 96–15%, respectively, at temperatures below about 200° F. to form an interdispersion and then blending said interdispersion with agitation at temperatures above about 200° F. until the dispersion is substantially dissolved.

2. The composition of matter of claim 1 wherein (I) is an unvulcanized elastomeric block copolymer having the configuration
   polystyrene-polybutadiene-polystyrene.

3. The composition of matter of claim 1 wherein
   (I) is an unvulcanized elastomeric block copolymer having the configuration
   polystyrene-polyisoprene-polystyrene.

4. The composition of matter of claim 1 wherein (III) is a petroleum wax.

5. The composition of matter of claim 1 wherein A is a non-elastomeric monovinyl aromatic hydrocarbon polymer block and B is an elastomeric conjugated diene polymer block, the total A content being between about 10 and 50% by weight of said block copolymer A—B—A, said copolymer having been prepared with a lithium based catalyst and having a tensile strength at 23° C. in excess of about 1400 pounds per square inch, and (III) is a petrolatum.

6. The composition of matter of claim 1 wherein (III) is polyalkylene wax.

7. A process of preparing the composition of matter of claim 1 which comprises
   (a) blending the components (I), (II) and (III) in proportions, by weight, of about 2–35%, about 2–50% and about 96–15%, respectively, at temperatures below about 200° F. to form an interdispersion and
   (b) then blending said interdispersion with agitation at temperatures above about 200° F. until dispersion is substantially dissolved.

8. An article of manufacture containing the composition of claim 1.

9. The process of preparing the composition of matter of claim 2 which comprises
   (a) blending the components (I), (II) and (III) in proportions by weight, of about 2–35%, about 2–50% and about 96–15%, respectively, at temperatures below about 200° F. to form an interdispersion and
   (b) then blending said interdispersion with agitation at temperatures above about 200° F. until the dispersion is substantially dissolved.

10. The composition of matter of claim 5 wherein (I) is an unvulcanized elastomeric block copolymer having the configuration of
    polystyrene-polybutadiene-polystyrene.

11. The composition of matter of claim 5 wherein (I) is an unvulcanized elastomeric block copolymer having the configuration of
    polystyrene-polyisoprene-polystyrene.

12. The composition of matter of claim 11 wherein each polystyrene block has an average molecular weight of 5,000–50,000 and the polyisoprene block has an average molecular weight of 50,000–500,000 and a cis-1,4-content of 80–97% and said lithium based catalyst is a lithium alkyl catalyst.

13. The process of claim 7 wherein step (a) is carried out at about 110–180° F. and step (b) is carried out at about 250–300° F.

References Cited

UNITED STATES PATENTS

| | | | |
|---|---|---|---|
| 2,490,550 | 12/1949 | Sermattei | 260—28.5 |
| 3,060,136 | 10/1962 | Nelson et al. | 260—28.5 |
| 3,239,478 | 3/1966 | Harlan | 260—27 |
| 3,298,862 | 1/1967 | Fairchild | 260—28.5 |
| 3,325,430 | 6/1967 | Grasley | 260—876 |
| 3,441,530 | 4/1969 | Bauer et al. | 260—28.5 |

FOREIGN PATENTS 1,019,851    2/1966    Great Britain.

OTHER REFERENCES

Railsback et al.: "Rubber Age," January 1964, pp. 583 to 589.

HOSEA E. TAYLOR, Primary Examiner

W. E. PARKER, Assistant Examiner

U.S. Cl. X.R.

117—161, 168; 161—235, 246, 250; 260—28.5, 876